United States Patent [19]

Wilk

[11] 4,236,688
[45] Dec. 2, 1980

[54] ANCHORING DEVICES

[76] Inventor: John J. Wilk, 608 Longwood Ct., Glenwood, Ill. 60425

[21] Appl. No.: 3,368

[22] Filed: Jan. 15, 1979

[51] Int. Cl.³ .............................................. F16B 15/00
[52] U.S. Cl. .................................. 248/71; 248/218.3; 248/217.1; 24/87 C
[58] Field of Search ............... 248/217.1, 217.2, 218.2, 248/218.3, 218.4, 71, 317; 24/87 C, 87 TB, 85 C, 161, 150 B

[56] References Cited

U.S. PATENT DOCUMENTS

| 480,242 | 8/1892 | Bankson | 24/87 TB |
|---|---|---|---|
| 511,238 | 12/1893 | Hieatzman | 24/150 B |
| 1,409,800 | 3/1922 | Turner | 248/217.1 |
| 1,851,220 | 3/1932 | Tarbox | 24/87 C |
| 2,423,455 | 7/1947 | Larson | 248/71 |
| 2,900,692 | 8/1959 | Lincoln | 24/161 |
| 3,032,305 | 5/1962 | Mittenzwei | 248/71 X |
| 3,809,358 | 5/1974 | Hazeley | 248/317 |

*Primary Examiner*—Francis K. Zugel
*Attorney, Agent, or Firm*—John Vander Weit, Jr.

[57] ABSTRACT

An anchor useful for attaching articles to a member of predetermined width including a support section, a pair of arms extending from the support section, each arm extending to an end away from the support section, a retainer at each of the ends of the arms being affixed so that as the arms are pushed onto a member of predetermined width, the retainers force the pair of arms apart and when the arms are pulled off the member of predetermined width, the retainers tend to grip the member of predetermined width, where the arms are spaced apart from one another by a distance substantially equal to the width of the member of predetermined width, where the retainers define a plane with which the retainers are substantially aligned, where the retainers extend toward each other and toward the support section such that when viewed from a line of sight perpendicular to the plane formed by the retainers, the angles formed by each of the retainers and each of the respective arms is substantially acute and the arms are substantially parallel, and where the contact point of the retainers with the member of predetermined width when the arms are pushed onto and around a member of predetermined width is such that the contact point when viewed from a line of sight perpendicular to the plane formed by the retainers includes a lower wall which extends away from the support section and an upper wall which extends away from the support section and away from the other retainer.

7 Claims, 7 Drawing Figures

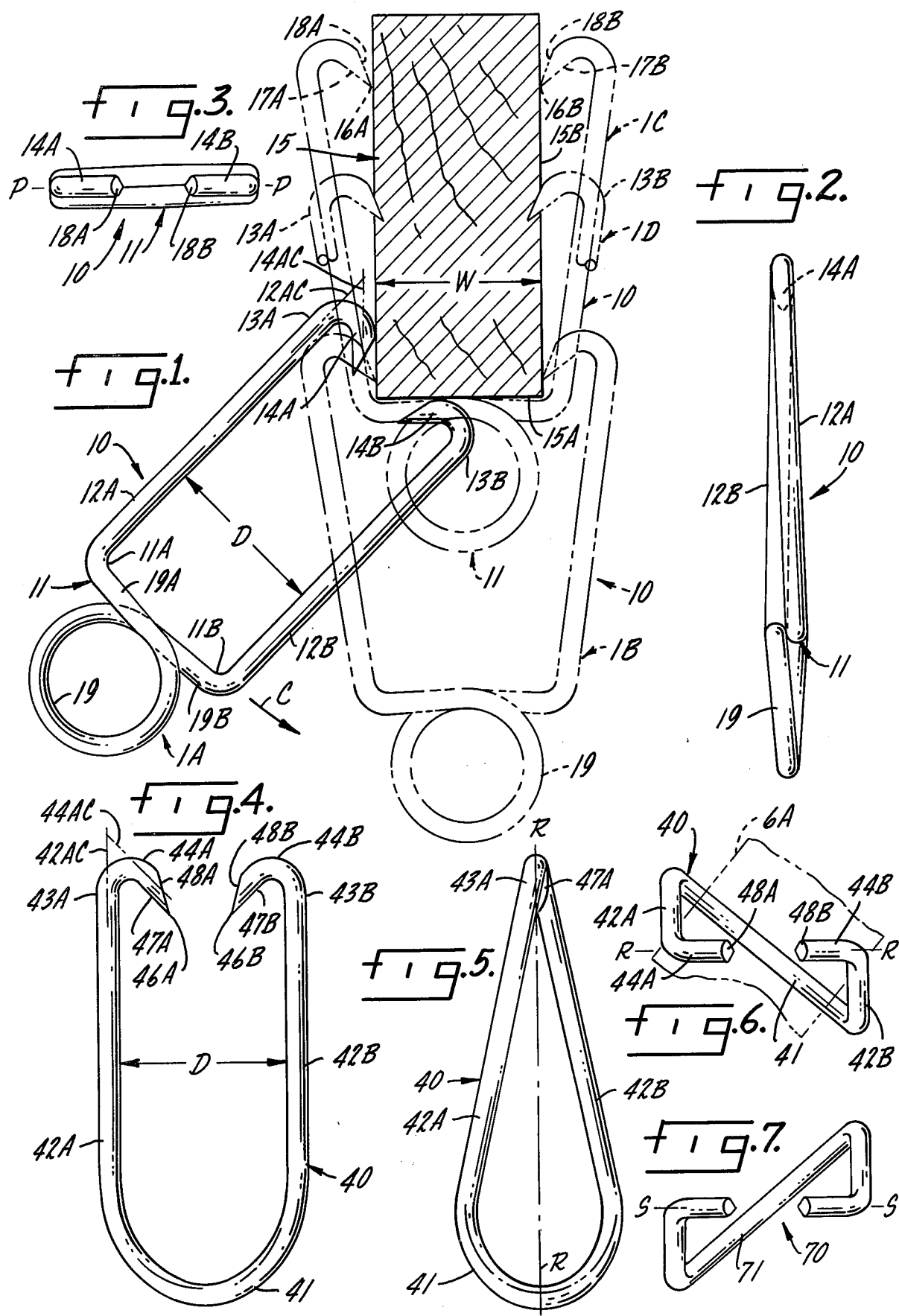

ANCHORING DEVICES

BACKGROUND OF THE INVENTION

This invention relates generally to devices useful for fastening or attaching articles to members with a predetermined width and more particularly, concerns an anchor which is useful to attach a support section for different articles to members of predetermined widths such as studs, joists, or the like.

It is often necessary to fasten articles such as pipes, conduits, clothes lines, shelves or the like to studs or joists found in homes or businesses. One of the problems in attaching such articles is the awkwardness of the area in which one has to work. Thus, one finds that they usually have to use a stool or ladder to reach to attach the articles or that the space with which they have to work is restricted by adjacent joists, studs, heating ducts or other obstructions. In the past, nails or other tacking type devices have been used. In particular, a pipe hanger which comprises two nail-like portions connected at right angles to a U-shaped bracket which holds the pipe when the nail-like portions are hammered into the stud. A disadvantage of this type of pipe hanger is that it is often quite difficult to nail the nail-like portions of the bracket to the stud due to confined space, moreover, the nail-like portions may often loosen or pull away from the stud. Quite commonly, such pipe hanging brackets also fail to support the pipe along its entire length, since once they are nailed into the stud, it is difficult to remove them and raise or lower them as desired. In U.S. Pat. No. 1,439,302 to J. O. Erickson, a hook is shown which comprises a complicated two piece construction coupled with a coil spring which is unsuitable for use on ceiling joist to support verticle loads and was designed for only wall hooks. Similarly, in U.S. Pat. No. 4,015,809 to Buril, a hanger which provides for hanging devices from wall studs, utilized a two piece construction and still requires nailing to attach the device to a stud. U.S. Pat. Nos. 3,784,144 to Ollinger, et al; and 3,809,358 to Hazeley, show ceiling system suspension clips and runners which are used for specific purposes of attaching ceiling tile to a ceiling but are quite limited in their versatility and do not provide the flexibility and advantages of the instant invention.

Accordingly, it is an object of the instant invention to provide a simple, self-contained, durable one-piece anchor useful for fastening articles to members whether aligned vertically, horizontally or at any angle. A further object is to provide an installation procedure that is simple, quick and easy with no preliminary installation preparations required and which avoids the necessity of fasteners such as nails or screws. A still further object is to provide an installation procedure which can be performed without tools of any kind.

Another object is to provide a positive anchor which is capable of supporting large weights, but also allowing easy adjustment of the anchor, including reusability. A related object is to provide a pair of anchors which will allow attachment of pipes or conduit to a specific joist so that the pipe may intersect the joist at any angle.

SUMMARY OF THE INVENTION

In accordance with the invention, an anchor useful for attaching articles to a member of predetermined width includes a support section, a pair of arms extending from the support section, each arm extending to an end away from the support section, a retainer at each of the ends of the arms being affixed so that as the arms are pushed onto a member of predetermined width, the retainers force the pair of arms apart and when the arms are pulled off the member of predetermined width, the retainers tend to grip the member of predetermined width, where the arms are spaced apart from one another by a distance substantially equal to the width of the member of predetermined width, where the retainers define a plane with which the retainers are substantially aligned, where the retainers extend toward each other and toward the support section such that when viewed from a line of sight perpendicular to the plane formed by the retainers, the angles formed by each of the retainers and each of the respective arms is substantially acute and the arms are substantially parallel, and where the contact point of the retainers with the member of predetermined width when the arms are pushed onto and around a member of predetermined width is such that the contact point when viewed from a line of sight perpendicular to the plane formed by the retainers includes a lower wall which extends away from the support section and an upper wall which extends away from the support section and away from the other retainer.

The support section may have circular or semicircular portion of other desired configuration. In one embodiment, the support section may be substantially aligned within the plane defined by the retainers.

In a preferred embodiment, the support section defines a plane which is substantially aligned with the support section and is offset from the plane defined by the retainers by 45° clockwise or counter-clockwise. The clockwise or counter-clockwise configurations are necessary in order to allow attachment of pipes or the like at any angle relative to the member of predetermined width such as a joist, while providing positive contact with the pipe or the like.

BRIEF DESCRIPTION OF THE DRAWINGS

Other objects and advantages of the invention will become apparent upon the following detailed description and upon reference to the drawings in which:

FIG. 1 is an elevation of an anchor constructed in accordance with the embodiments of the instant invention which shows by phantom and phantom sectional views, the anchor being attached to a member of predetermined width;

FIG. 2 is a side view of the anchor shown in FIG. 1;

FIG. 3 is a plan view of the anchor shown in FIG. 1;

FIG. 4 is an elevation of another anchor constructed in accordance with the principle of the instant invention;

FIG. 5 is a side view of the anchor shown in FIG. 4;

FIG. 6 is a plan view of the anchor shown in FIG. 4; and,

FIG. 7 is a plan view of still another anchor constructed in accordance with the principle of the instant invention.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

In FIGS. 1 through 3, there is shown an anchor 10 constructed in accordance with the principles of the instant invention. Anchor 10 comprises a support section 11, extending from approximately point 11A to approximately point 11B. An arm 12A and an arm 12B extend from support section 11 and have an end 13A and an end 13B away from support section 11, respectively on arm 12A and 12B.

A retainer 14A and a retainer 14B are attached at respective end 13A and end 13B of arm 12A and arm 12B. Stud 15 is shown in section and phantom representations of anchor 10 as it is attached to stud 15 are shown. Thus, anchor 10 is positioned so that retainers 14A and 14B surround a corner of stud 15 and as the user pushes anchor 10 in the direction of arrow C so that it goes from position 1A shown originally to phantom position 1B and then to phantom position 1C where anchor 10 is pushed onto and around stud 15 as far as possible. In the position 1D, retainer 14A and retainer 14B are shown as they have entered into stud 15 at an intermediate position between the bottom 15A of stud 15 on the side of stud 15. As can be seen, anchor 10 may be attached at any position intermediate between the bottom 15A of stud 15 and the phantom position 1C. The distance D between arm 12A and arm 12B is substantially equal to the width W of stud 15. This relationship allows arm 12A to be forced away from arm 12B by respective retainer 14A and retainer 14B as anchor 10 and the arms 12A and 12B are pushed onto and around stud 15. The forcing apart of arm 12A and arm 12B creates a tension which causes retainers 14A and retainer 14B to tend to grip stud 15 as anchor 10 is pulled off stud 15.

As seen in FIG. 1 and FIG. 3, retainer 14A and retainer 14B are substantially aligned in the same plane and define a plane P. In FIG. 1, plane P is substantially the same plane as the surface of the drawing. In FIG. 1, when viewed from a line of sight perpendicular to the sheet of drawings or plane P, the axis 14AC of retainer 14A and the axis 12AC of arm 12A intersect to form a substantially acute angle and, moreover, arms 12A and 12B are substantially parallel to one another.

In phantom position 1C, each of retainers 14A and 14B have a contact point 16A and 16B, respectively, which contact stud 15. Thus, when anchor 10 is pushed onto and around stud 15 and viewed from a line of sight perpendicular to plane P, there is a lower wall 17A and a lower wall 17B of retainer 14A and retainer 14B, respectively, which extend away from support section 11. From contact points 16A and 16B respectively, an upper wall 18A and upper wall 18B on the respective retainers 14A and 14B extend from the point of contact with stud 15 at contact points 16A and 16B respectively, away from support section 11 and away from the other retainer. The construction of the retainers in this manner allows each retainer to penetrate a stud 15, when constructed of wood, quite readily. This happens, since the fibers of the wood generally run perpendicular to the sectional area of stud 15 (also, perpendicular to plane P), allowing the retainer of each respective arm to enter and firmly grip stud 15 by merely separating the fibers of the wood rather than cutting the fibers.

In the embodiment shown in FIG. 1, support section 11 comprises a ring portion 19 which has attached flat portions 19A and 19B which extend outward to arms 12A and 12B respectively. A support section 11 constructed in accordance with ring portion 19 allows support of articles which have hooks or pipes which will fit through the inside diameter of ring portion 19 and, if the pipe's outer diameter is smaller than the inside diameter of ring portion 19, allow for a large degree of adjustment through ring portion 19.

In FIGS. 4 through 6, still another anchor constructed in accordance with the instant invention is shown. Anchor 40 includes a support section 41 which is connected at its opposite ends to arms 42A and 42B which have respective ends 43A and 43B. At respective ends 43A and 43B, are connected a retainer 44A and retainer 44B. Retainer 44A has contact point 46A and retainer 44B has contact point 46B. Retainer 44A additionally has lower wall 47A and upper wall 48A. Retainer 44B has a lower wall 47B and an upper wall 48B. Retainers 44A and 44B define a plane R as shown in FIG. 5 and FIG. 6. Similar to anchor 10, anchor 40 when viewed from a sight line perpendicular to plane R will show arm 42A and arm 42B substantially parallel, as seen FIG. 4 where the surface of the drawing is substantially the same plane as plane R. Likewise, arms 42A and 42B are displaced a distance D which is substantially equal to the width of the member of predetermined width. Also, the axis 42AC of arm 42A and the axis 44AC of retainer 44A will form substantially an acute angle opening toward support section 41. Similarly, upper walls 48A and 48B will extend from contact points 46A and 46B away from support section 41 and also away from the other retainer. Also, lower walls 47A and 47B will extend from contact points 46A and 46B away from support section 41. The plane which is defined by support section 41 within which support section 41 is substantially aligned will form a substantially 45 degree angle at the intersection with plane R when viewed from the ends with the retainers as seen in FIG. 6. This allows a pipe shown by phantom lines 6A to be fastened to a member of predetermined width or stud allowing it 90 degrees of freedom. Anchor 70 in FIG. 7 with support section 71 at a 45 degree angle to plane S, the plane defined by the retainers, allows a pipe to be attached to a stud so that it can have 90 degrees of freedom of rotation in the opposite manner to an anchor constructed according to that shown in FIG. 6. Thus, by having a pair of anchors one similar to that shown in FIG. 7 and one similar to that shown in FIG. 6, one may fasten a pipe at any angle relative to a given stud. This is accomplished by having the plane defined by the support section be displaced 45° clockwise or counterclockwise to the plane defined by the retainers when viewed along the axis of intersection of the two planes.

Thus, it is apparent that there has been provided in accordance with the invention, an anchor that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim:

1. An anchor useful for attaching articles to a wood member of predetermined width comprising:
    a support section including an arcuate portion;

a pair of arms extending from said support section, each arm extending to an end away from said support section;

a retainer at each of said ends of said arms being affixed so that as said arms are pushed onto a wood member of predetermined width, said retainers force said pair of arms apart and when said arms are pulled off a wood member of predetermined width, said retainers tend to grip the wood member of predetermined width;

wherein said arms are spaced apart from one another by a distance substantially equal to the width of the wood member of predetermined width;

wherein said retainers define a plane with which said retainers are substantially aligned;

wherein said retainers extend toward each other and toward said support section such that when viewed from a line of sight perpendicular to said plane formed by said retainers, the connection between each of said arms and each of said retainers is substantially arcuate, the angles formed by the axis of each of said retainers and the axis of each of said respective arms is substantially 45° and said arms are substantially parallel;

wherein the contact point of said retainers with the wood member of predetermined width when said arms are pushed onto and around the wood member of predetermined width is such that said contact point when viewed from a line of sight perpendicular to said plane formed by said retainers is formed by a rounded lower wall which extends away from said support and a flat upper wall which extends away from said support section and away from said other retainer; and, wherein said support section defines a plane, said support section plane forming substantially a 45° angle with said plane defined by said retainers.

2. An anchor as in claim 1 wherein said arcuate portion of said support section is circular.

3. An anchor as claim 1 wherein said arcuate portion of said support section is semi-circular.

4. An anchor as in claim 1 wherein the intersection of said plane defined by said retainers and said plane defined by said support section forms an axis.

5. An anchor as in claim 4 wherein when said anchor is viewed from said ends with said retainers, said plane defined by said support section is displaced by substantially 45° clockwise from said plane defined by said retainers.

6. An anchor as in claim 4 wherein when said anchor is viewed from said ends with said retainers, said plane defined by said support section is displaced by substantially 45° counter-clockwise from said plane defined by said retainers.

7. An anchor as in claim 1 wherein said arms extend in opposite directions away from said plane defined by said retainers.

* * * * *